(12) United States Patent
Maehara

(10) Patent No.: US 6,257,274 B1
(45) Date of Patent: Jul. 10, 2001

(54) VALVE OPENING AND CLOSING MECHANISM

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/482,919

(22) Filed: Jan. 14, 2000

(30) Foreign Application Priority Data

Jan. 14, 1999 (JP) .................................................. 11-007995

(51) Int. Cl.$^7$ ....................................................... G05D 7/01
(52) U.S. Cl. ............................................................ 137/504
(58) Field of Search ............................... 137/505.25, 504, 137/508, 599.18

(56) References Cited

U.S. PATENT DOCUMENTS

| | | | |
|---|---|---|---|
| 2,917,073 | * 12/1959 | Dinkelkamp | 137/505.25 X |
| 4,147,180 | * 4/1979 | Steele | 137/599.18 |
| 4,785,847 | * 11/1988 | Steer et al. | 303/9.62 |
| 5,396,918 | * 3/1995 | Parker | 137/14 |
| 5,860,448 | * 1/1999 | Lee et al. | 137/508 |

* cited by examiner

Primary Examiner—Stephen M. Hepperle
(74) Attorney, Agent, or Firm—Morgan, Lewis & Bockius LLP

(57) ABSTRACT

A valve opening and closing mechanism comprising a cylinder, a control piston, a valve guide, and a valve assembly. The cylinder includes an inlet for supplying fluid. The control piston is slidably fitted to the cylinder and includes a first fluid passageway for flowing the fluid supplied into the cylinder. The valve guide is supported in a fluid chamber defined by the cylinder and the control piston. The valve guide includes a shaft portion and a valve support portion. The shaft portion is inserted into the first fluid passageway with defining a first clearance, and the valve support portion is formed into a collar at a base end of the shaft portion and faced an end surface of the control piston. The shaft portion of the valve guide have a conical surface portion for reducing a first sectional area of flowing the fluid when the control piston is displaced toward the fluid chamber. The valve assembly is loosely fitted to the shaft portion so as to move toward the control piston with flow of the fluid to narrow the first fluid passageway when a flow rate of the fluid flowing through the first fluid passageway reaches a predetermined value or more.

2 Claims, 3 Drawing Sheets

VALVE OPENING AND CLOSING MECHANISM

BACKGROUND OF THE INVENTION

1. Field of the Invention

The present invention relates to a valve opening and closing mechanism which is preferable to be used, for example, for opening and closing an operating fluid passageway in a wheel cylinder for expanding brake shoes of a drum brake device.

2. Description of the Related Art

Conventionally, various types of drum brake devices are used for braking the running of vehicles. These drum brake devices are classified into a leading trailing type, a two leading type, a duo-servo type, and so on, in accordance with the arrangement of brake shoes pressed against an inner circumferential surface of a substantially cylindrical drum.

A duo-servo type drum brake device is generally provided with a pair of brake shoes, which are primary and secondary shoes disposed oppositely to each other in a cylindrical drum.

The primary shoe is designed so that its entrance side in the forward rotation direction of the drum is served as an input portion while its exit side in the forward rotation direction of the drum is, for example, connected to the entrance side of the secondary shoe through an adjuster. On the other hand, the exit side of the secondary shoe is made to abut against an anchor portion mounted on a backing plate so as to receive anchor reaction force acting on the primary and secondary shoes.

Consequently, when the primary and secondary shoes are expanded and pressed against the inner circumferential surface of the drum, the anchor reaction force acting on the primary shoe is put into the entrance side of the secondary shoe. Thus, the anchor reaction force acts on the secondary shoe so as to press the secondary shoe against the inner circumferential surface of the drum. As a result, both the primary and secondary shoes act as leading shoes so that braking force with very high gain can be obtained.

The above-mentioned duo-servo type drum brake device has many advantages in comparison with the leading trailing type or two leading type drum brake device in that not only it can gain an extremely high braking force but also it can be miniaturized easily, and it can be incorporated with a parking brake easily.

Such a duo-servo type drum brake device is, however, sensitive to a change in the friction coefficient of the lining of each brake shoe. Accordingly, the duo-servo type drum brake device tends to be difficult to stabilize its braking force. A device for stabilizing the braking force is therefore needed.

Thus, the applicant of this application has made various proposals about a wheel cylinder which can control pressing force transferred to brake shoes, so that anchor reaction force is limited to a predetermined ratio relative to the fluid pressure supplied from a master cylinder in order to stabilize the braking force in a duo-servo type drum braking system. Further, the applicant of this application has an object to develop a high-performance wheel cylinder which can perform relaxation of impact at the time of quick braking and fine control of braking force.

To develop such a wheel cylinder, it is necessary and essential to develop a valve for precisely and smoothly controlling the supply of operating fluid supplied from a master cylinder. Such a valve has been therefore regarded as one of most important problems to be solved in the future.

SUMMARY OF THE INVENTION

Taking the foregoing situation into consideration, it is an object of the present invention to provide a valve opening and closing mechanism in which the quick opening and closing of a fluid passageway can be avoided. Therefore, for example, if the valve opening and closing mechanism is used in a wheel cylinder of a duo-servo type drum brake device, a sudden change in the supply of operating fluid can be prevented, and both the relaxation of impact at the time of quick braking and the fine control of the braking force can be realized.

In order to achieve the above object, according to the present invention, there is provided a valve opening and closing mechanism comprising: a cylinder having an inlet for supplying fluid pressure; a control piston which is slidably fitted to the cylinder and in which a fluid passageway for passing operating fluid supplied into the cylinder is formed at a center of the control piston so as to penetrate the control piston; a valve guide supported in a fluid chamber defined by the cylinder and the control piston, and provided with a shaft portion and a valve support portion, the shaft portion being inserted into the fluid passageway of the control piston so as to reserve a clearance for passing the operating fluid, the valve support portion being formed into a collar at a base end of the shaft portion so as to face an end surface of the control piston; and a valve assembly loosely fitted to the shaft portion of the valve guide so as to move toward the control piston with flow of the operating fluid to thereby narrow the fluid passageway of the control piston when a flow rate of the operating fluid passing through the fluid passageway of the control piston reaches a predetermined value or more; wherein a conical surface portion for gradually reducing a sectional area for passing the operating fluid when the control piston is displaced toward the fluid chamber is provided in the shaft portion of the valve guide inserted into the fluid passageway.

Preferably, in the valve opening and closing mechanism according to the present invention; the valve assembly may include an inner ring portion and an outer ring portion, the inner ring portion defining a clearance between the inner ring portion and the shaft portion so that the clearance will be a fluid passageway has a sectional area for passing the operating fluid smaller than that of the clearance between the fluid passageway of the control piston and the shaft portion, the outer ring portion being held tightly between the control piston and the valve support portion to thereby close the fluid passageway of the control piston in cooperation with the valve support portion when the quantity of displacement of the control piston toward the fluid chamber reaches a predetermined value; and the outer ring portion may abut tightly against an end surface of the control piston when the flow rate of the operating fluid passing through the fluid passageway of the control piston reaches a predetermined value or more to thereby displace the valve assembly toward the control piston, so that the fluid passageway of the control piston is switched to a mode in which the fluid passageway of the control piston communicates with the fluid chamber inside the cylinder through a clearance between the inner ring portion and the shaft portion.

According to the aforementioned configuration, when the supply of the operating fluid from the inlet to the fluid chamber in the cylinder increases suddenly so that the flow rate of the operating fluid passing through the fluid passageway of the control piston from the fluid chamber in the cylinder reaches a predetermined value or more, the valve assembly is displaced toward the control piston so as to narrow the fluid passageway of the control piston substantially. Thus, the supply of the operating fluid through the fluid passageway can be restrained.

Moreover, when the control piston is suddenly displaced toward the fluid chamber in the cylinder and the quantity of displacement of the control piston reaches a predetermined value so that the valve assembly is held between the control piston and the valve support portion of the valve guide, the fluid passageway of the control piston is closed so that the supply of the operating fluid from the fluid passageway is stopped. However, during the displacement of the control piston before the fluid passageway of the control piston is closed, the sectional area for passing the operating fluid is reduced gradually due to the conical surface portion provided in the fluid passageway of the control piston or on the shaft portion of the valve guide. Thus, there is no fear that the fluid passageway is closed at a stretch.

That is, in the aforementioned valve opening and closing mechanism, the supply of the operating fluid is prevented from increasing or decreasing suddenly in either the case where the operating fluid is supplied through the fluid passageway of the control piston or the case where the fluid passageway of the control piston is closed to stop the supply of the operating fluid.

Therefore, if the valve opening and closing mechanism is, for example, used in a wheel cylinder of a duo-servo drum brake device in order to open or close a fluid passageway in a cylinder receiving fluid pressure from a master cylinder, a sudden change in the supply of the operating fluid or quick close of the fluid passageway can be prevented at the time of braking. Accordingly, both the relaxation of impact at the time of quick braking or the fine control of the braking force can be realized.

DETAILED DESCRIPTION OF THE PREFERRED EMBODIMENT

A preferred embodiment of a valve opening and closing mechanism according to the present invention will be described below in detail with reference to the drawings.

Figure 1:
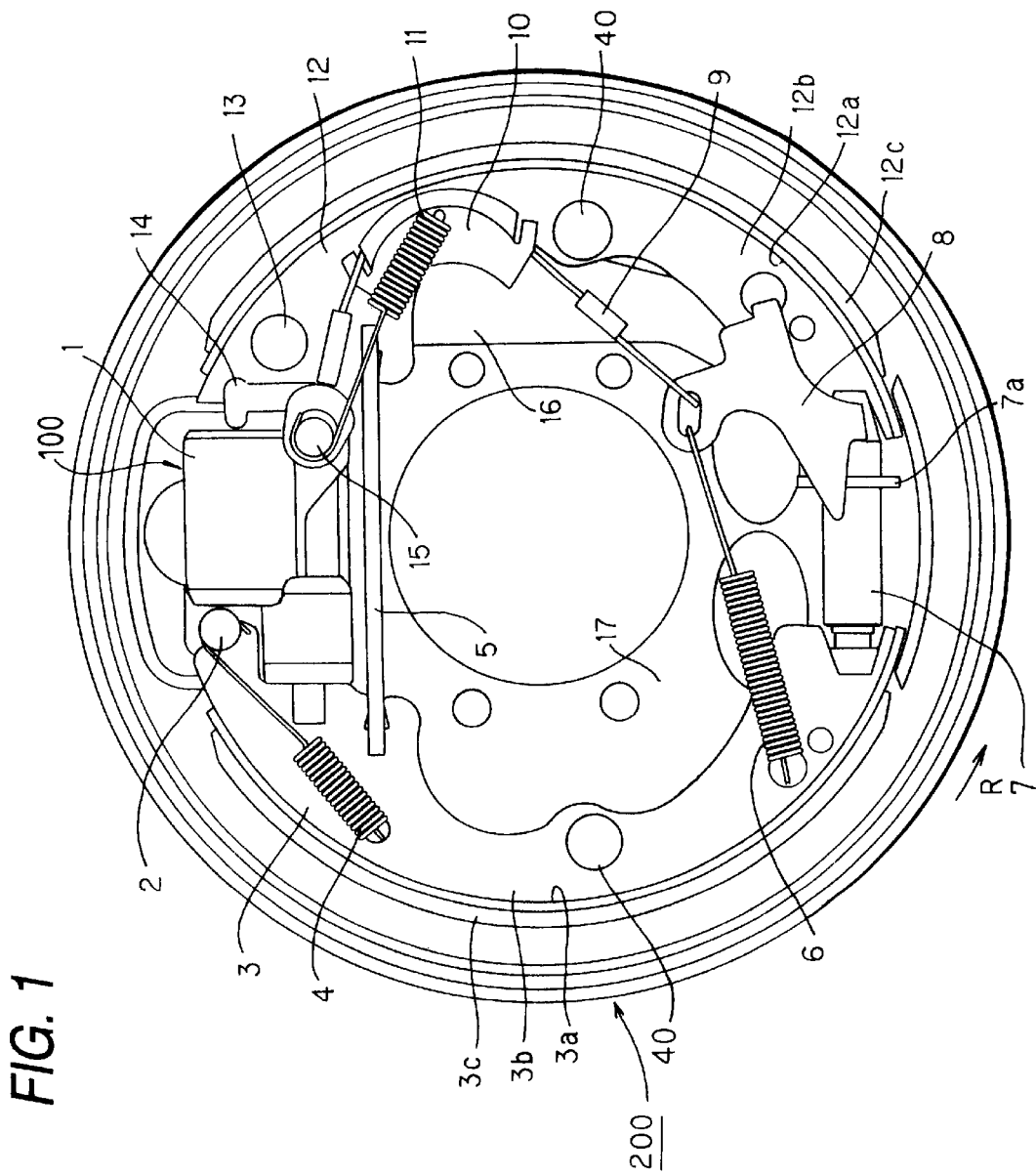
FIG. 1 is a front view showing an embodiment of a duo-servo type drum brake device using a wheel cylinder to which a valve opening and closing mechanism according to the present invention is applied.
Figure 2:
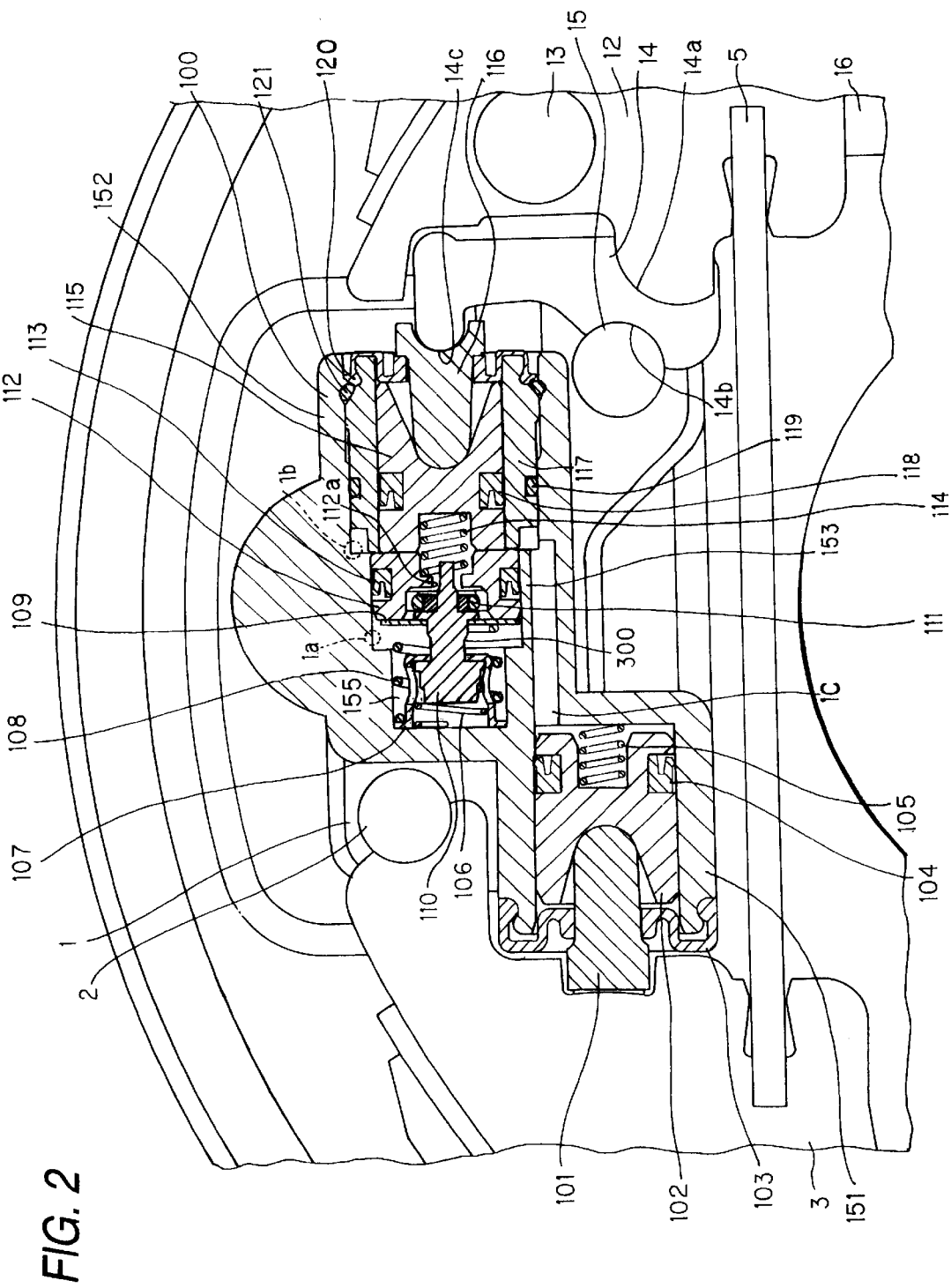
FIG. 2 is a longitudinally sectional view of the wheel cylinder shown in FIG. 1.
Figure 3:
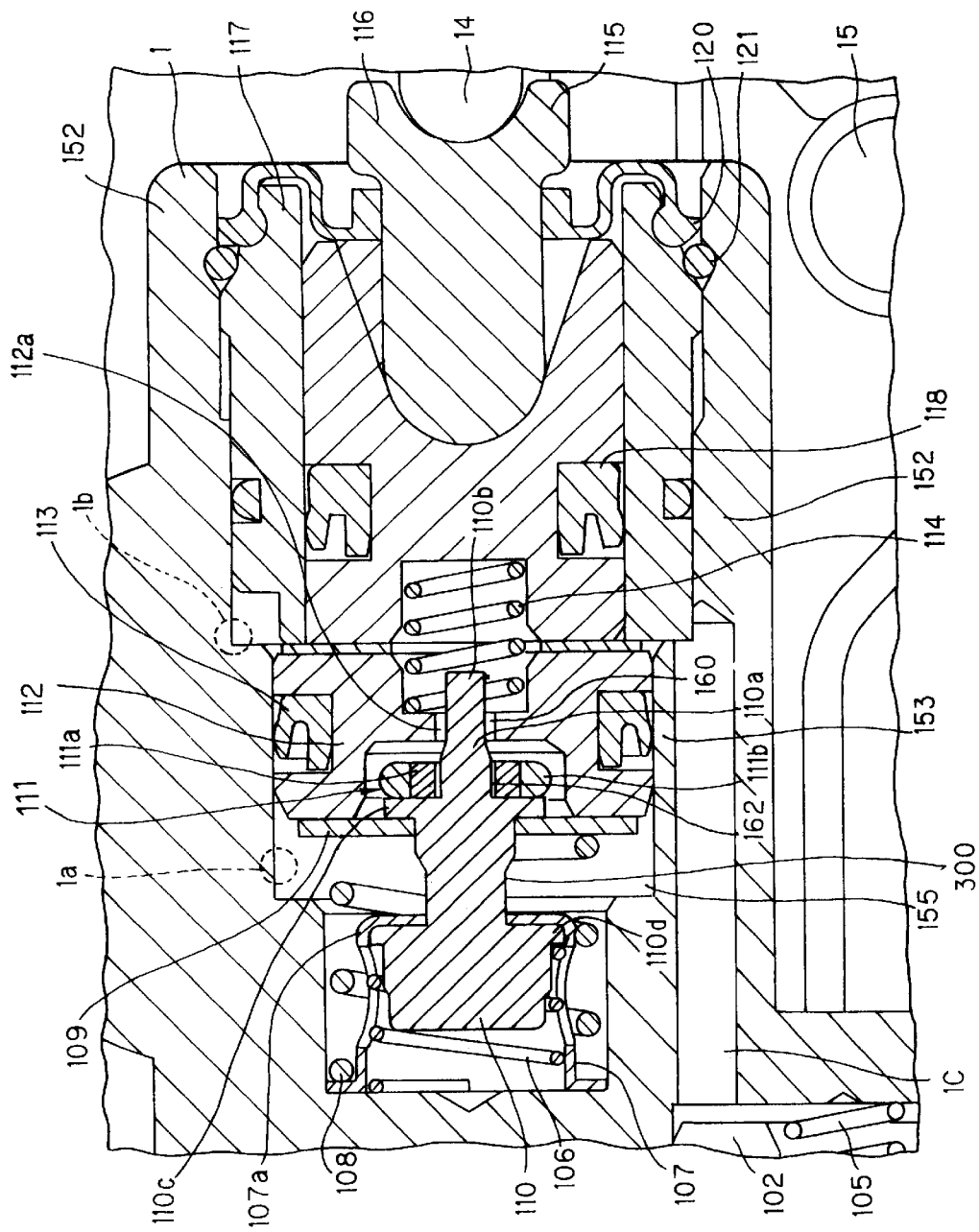
FIG. 3 is an enlarged view of the valve opening and closing mechanism in the wheel cylinder shown in FIG. 2.

FIG. 1 is a front view showing an embodiment of a duo-servo type drum brake device using a wheel cylinder to which a valve opening and closing mechanism according to the present invention is applied. FIG. 2 is a longitudinally sectional view of the wheel cylinder shown in FIG. 1. FIG. 3 is an enlarged view of the valve opening and closing mechanism in the wheel cylinder shown in FIG. 2.

A duo-servo type drum brake device 200 has a pair of primary and secondary shoes 3 and 12 disposed oppositely to each other in a space in a not-shown substantially cylindrical drum, a wheel cylinder 1 disposed between opposing one-ends of the respective brake shoes 3 and 12 so as to expand the respective brake shoes 3 and 12, an adjuster 7 disposed between the opposing other-ends of the respective brake shoes 3 and 12 so as to also have a link function to supply the output of the primary shoe 3 into the secondary shoe 12, a backing plate 17 for supporting these constituent members, and anchor pins 2 and 15 fixedly mounted on opposite end portions of a cylinder body 100 of the wheel cylinder 1.

The pair of brake shoes 3 and 12 are constituted by arc-plate-like rims 3a and 12a along the inner circumferential surface of the drum, webs 3b and 12b extending inward from these rims 3a and 12a, and linings 3c and 12c pasted on the outer circumferences of the rims 3a and 12a, respectively. Then, the respective brake shoes 3 and 12 are attached to a backing plate 17 through hold-down means 40 penetrating the webs 3b and 12b, movably toward the inner circumferential surface of the drum.

In addition, the respective opposing end portions of the pair of brake shoes 3 and 12 on the backing plate 17 are urged in a direction to approach each other (that is, in a direction to leave the drum) by shoe-to-anchor springs 4 and 11 which engage at their one ends with the webs 3b and 12b of the brake shoes 3 and 12 while engaging at their other ends with the anchor pins 2 and 15, respectively.

Further, a strut 5 and a parking lever 16 are also incorporated onto the backing plate 17. The parking lever 16 is rotatably connected to the backing plate 17 through a parking lever pin 13. Thus, the pair of brake shoes 3 and 12 can be pressed against the drum also by the rotating operation of the parking lever 16.

The essence of the adjuster 7 disposed between the respective opposing other ends of the pair of brake shoes 3 and 12 is to adjust the distance between these end portions of the brake shoes 3 and 12 in accordance with the progress of wear of the linings 3c and 12c of the brake shoes 3 and 12.

This adjuster 7 is designed so that the distance between the end portions of the brake shoes 3 and 12 is adjusted automatically by rotating an adjusting gear 7a through an adjuster lever 8 which rocks with the expanding operation of the brake shoes.

The movement of the adjuster lever 8 is controlled by the connection between an adjuster cable 9, which is connected at its one end to the anchor pin 15 through a cable guide 10, and an adjuster spring 6, which is connected at its one end to the web 3b of the primary shoe 3.

The not-shown drum is coaxial with the backing plate 17, and rotates in the direction of the arrow R in FIG. 1 when the vehicle moves forward.

As shown in FIG. 2, the wheel cylinder 1 has a configuration in which a piston 102 for driving the primary shoe 3 to expand, a piston 115 for driving the secondary shoe 12 to expand, a control piston 112 for controlling the supply of fluid pressure to the pistons 102 and 115, a valve opening and closing mechanism 300 for opening and closing a fluid passageway provided in the control piston 112 in accordance with the operation of the control piston 112, the aforementioned anchor pins 2 and 15, and so on, are incorporated to a cylinder body 100, as shown in FIG. 2.

The cylinder body 100 has a configuration as follows. A first cylinder 151 for slidably holding the piston 102 for the primary shoe 3 and a second cylinder 152 for slidably holding the piston 115 for the secondary shoe 12 are disposed in parallel so that their positions are shifted from each other so as to be uneven in the radial direction of the drum. In addition, the anchor pin 15 for the secondary shoe 12 is attached to the cylinder body 100 behind the first cylinder 151 and adjacently to the second cylinder 152. The anchor pin 2 for the primary shoe 3 is attached to the cylinder body 100 behind the second cylinder 152 and adjacently to the first cylinder 151.

In the aforementioned cylinder body 100, the first and second cylinders 151 and 152 communicate with each other through a fluid passageway 1c provided in the cylinder body 100. In addition, the second cylinder 152 is provided with an air bleeder 1b.

Further, a third cylinder 153 for holding the control piston 112 slidably is provided deep in the inside of the second cylinder 152. This third cylinder 153 is provided with an inlet 1a for receiving the supply of fluid pressure from a master cylinder. Thus, a space defined by the control piston 112 and the third cylinder 153 functions as a fluid chamber 155 for receiving the supply of the master cylinder fluid pressure.

A fluid passageway 112a for making the fluid chamber 155 communicate with the second cylinder 152 is formed at a center portion of the control piston 112 so as to penetrate the control piston 112. In addition, a cup seal 113 for sealing a gap between the control piston 112 and the third cylinder 153 is attached to an outer circumferential portion of the control piston 112. Operating fluid supplied to the fluid chamber 155 is fed to the second and first cylinders 152 and 151 through the fluid passageway 112a.

A valve opening and closing mechanism 300 for opening and closing the fluid passageway 112a is mounted inside the fluid chamber 155. In addition, a spring 114 for urging the control piston 112 and the piston 115 is provided between those pistons so as to keep a suitable distance therebetween.

Further, the control piston 112 is urged toward the piston 115 by a set spring 108. The set spring 108 is provided between a spring sheet 107 disposed on an inner bottom portion of the third cylinder 153 and a plate 109 made to abut against an end surface of the control piston 112 in the state where the set spring 108 is compressed therebetween. The urging force of the set spring 108 is set to be stronger than the urging force of the spring 114.

The piston 102 for driving the primary shoe 3 is urged toward the primary shoe 3 by a spring 105 received between the piston 102 and the inner bottom of the first cylinder 151. The spring 105 keeps the piston 102 abutting against the primary shoe 3 through a rod 101 at any time except braking.

At the time of braking, the piston 102 advances toward the primary shoe 3 due to the operating fluid pressure supplied into the first cylinder 151 from the fluid chamber 155 through the fluid passageways 112a and 1c. As a result, the piston 102 presses the primary shoe 3 against the drum through the rod 101.

A dust boot 103 for preventing foreign matters from entering the first cylinder 151 is provided at the open end of the first cylinder 151. In addition, a cup seal 104 for sealing a gap between the piston 102 and the first cylinder 151 is mounted on the outer circumference of the piston 102.

The piston 115 for driving the secondary shoe 12 is supported on the secondary cylinder 152 through a cylindrical plug 117 fitted to the secondary cylinder 152. This piston 115 is urged toward the secondary shoe 12 by the spring 114 provided between the piston 115 and the control piston 112. The spring 114 keeps the piston 115 abutting against the secondary shoe 12 through a rod 116 and a control lever 14 at any time except braking.

At the time of braking, the piston 115 advances toward the secondary shoe 12 due to the operating fluid pressure supplied into the second cylinder 152 from the fluid chamber 155 through the fluid passageway 112a. As a result, the piston 115 presses the secondary shoe 12 against the drum through the rod 116 and the control lever 14.

The plug 117 is locked by a lock clip 121 fitted to the vicinity of the open end of the second cylinder 152. In addition, an O-ring 119 for sealing a gap between the plug 117 and the second cylinder 152 is provided on the outer circumference of the plug 117.

Further, a dust boot 120 for preventing foreign matters from entering the second cylinder 152 is provided at the open end of the plug 117. In addition, a cup seal 118 for sealing a gap between the piston 115 and the plug 117 is mounted on the outer circumference of the piston 115.

The control lever 14 is constituted by a shoe abutment portion 14a abutting against the secondary shoe 12, an anchor abutment portion 14b abutting against the anchor pin 15 rotatably, and a rod abutment portion 14c abutting against the rod 116. The anchor reaction force acting from the secondary shoe 12 is distributed to the anchor pin 15 and the rod 116 in a predetermined ratio.

The anchor reaction force from the secondary shoe 12 transferred to the rod 116 through the control lever 14 urges the piston 115 toward the control piston 112.

Forces of the respective pistons 102 and 115 to press the respective brake shoes 3 and 12 against the drum increase in accordance with the fluid pressure supplied from the master cylinder to the respective cylinders 151 and 152 through the fluid passageway 112a of the control piston 112, respectively. Then, the anchor reaction force also increases with the increase of the forces of the respective pistons 102 and 115 to press the respective brake shoes 3 and 12.

For example, when the anchor reaction force acting on the control lever 14 from the secondary shoe 12 reaches a predetermined ratio relative to the fluid pressure from the master cylinder at the time of braking during forward running of the vehicle, the urging force based on the anchor reaction force acting on the piston 115 from the control lever 14 through the rod 116 becomes larger than the urging force based on the fluid pressure urging the piston 115. Then, the piston 115 is pushed back toward the control piston 112 by the anchor reaction force so as to push the control piston 112 back toward the fluid chamber 155. Then, when the quantity of displacement of the control piston 112 toward the fluid chamber 155 due to the anchor reaction force reaches a predetermined value, the fluid passageway 112a of the control piston 112 is closed by the valve opening and closing mechanism 300, so that the supply of the fluid pressure to the cylinders 151 and 152 is stopped. As a result, the increase of the anchor reaction force is limited.

As shown in FIG. 3, the valve opening and closing mechanism 300 of this embodiment is constituted by the third cylinder 153 functioning as a valve housing, the control piston 112, a valve guide 110 rotatably supported in the fluid chamber 155 defined by the third cylinder 153 and the control piston 112, and a valve assembly 111 supported by this valve guide 110.

The valve guide 110 has a shaft portion 110b inserted into the fluid passageway 112a while reserving a clearance 160 for passing the operating fluid, and a valve support portion 110c formed into a collar at a base end of the shaft portion 110b so as to face an end surface of the control piston 112. Further, a conical surface portion 110a is provided in the shaft portion 110b so as to gradually reduce a sectional area for passing the operating fluid when the control piston 112 is displaced toward the fluid chamber 155 by the anchor reaction force.

An enlarged diameter portion 110d at the base end of this valve guide 110 is held displaceably in the axial direction (in the left and right direction in FIG. 3) by the spring sheet 107 pressed and fixed onto the inner bottom of the fluid chamber 155 by the set spring 108. Since the enlarged diameter portion 110d abuts on a bent portion 107a at the front end portion of the spring sheet 107, the maximum advance position of the valve guide 110 toward the control piston 112 is limited. The valve guide 110 is urged toward the control piston 112 by a valve spring 106 provided in a compressed state in the spring sheet 107. Accordingly, the valve guide 110 is elastically supported in the state where the enlarged diameter portion 110d abuts against the bent portion 107a of the spring sheet 107.

Since the valve guide 110 is elastically supported thus, the valve guide 110 is displaced against the urging force of the valve spring 106 and toward the inner bottom of the piston 115 when a compression load which is larger than the urging force of the valve spring 106 acts on the valve guide 110 through the valve assembly 111 or the like.

The valve assembly 111 is loosely fitted to the shaft portion 110b of the valve guide 110 so as to move toward the control piston 112 with the flow of the operating fluid when the flow rate of the operating fluid passing through the fluid passageway 112a of the control piston 112 reaches a predetermined value or more.

This valve assembly 111 is constituted by an inner ring portion 111a and an outer ring portion 111b. The inner ring portion 111a defines a clearance between the inner ring portion 111a and the shaft portion 110b so that the clearance will be a fluid passageway having a sectional area for passing the operating fluid which is smaller than that of the clearance between the fluid passageway 112a of the control piston 112 and the shaft portion 110b. The outer ring portion 111b is held tightly between the control piston 112 and the valve support portion 110c to thereby close the fluid passageway 112a of the control piston 112 in cooperation with the valve support portion 110c when the quantity of displacement of the control piston 112 toward the fluid chamber 155 reaches a predetermined value.

In the valve opening and closing mechanism described above, for example, when the quantity of the operating fluid supplied from the inlet 1a into the fluid chamber 155 increases rapidly due to quick braking and hence the flow rate of the operating fluid passing through the fluid passageway 112a of the control piston 112 reaches a predetermined value or more, the valve assembly 111 is displaced toward the control piston 112 with the flow of the operating fluid. Accordingly, the outer ring portion 111b of the valve assembly 111 abuts tightly against the end surface of the control piston 112.

In this case, the fluid passageway 112a of the control piston 112 is changed over to a mode in which the fluid passageway 112a communicates with the fluid chamber 155 inside the cylinder through a clearance 162 between the inner ring portion 111a and the shaft portion 110b.

On the other hand, assume that the anchor reaction force reaches a predetermined ratio relative to the fluid pressure supplied from the master cylinder at the time of braking so that the control piston 112 is displaced toward the fluid chamber 115 by the anchor reaction force. In this case, when the quantity of displacement of the control piston 112 toward the fluid chamber 155 reaches a predetermined value, the outer ring portion 111b of the valve assembly 111 is held tightly between the control piston 112 and the valve support portion 110c of the valve guide 110. Thus, the fluid passageway 112a of the control piston 112 is closed.

As a result, the operating fluid supplied to the respective pistons 102 and 115 is kept constant, so that the anchor reaction force is restrained from increasing more.

In addition, even if the displacement rate of the control piston 112 due to the anchor reaction force is rapid, during the displacement of the control piston 112 before the fluid passageway 112a of the control piston 112 is closed, the sectional area for passing the operating fluid is reduced gradually due to the conical surface portion 110a provided on the shaft portion 110b of the valve guide 110. Thus, there is no fear that the fluid passageway 112a is closed at a stretch.

That is, in the aforementioned valve opening and closing mechanism 300, the supply of the operating fluid is prevented from increasing or decreasing suddenly in either the case where the operating fluid is supplied through the fluid passageway 112a of the control piston 112 or the case where the fluid passageway 112a is closed to stop the supply of the operating fluid.

It is therefore possible to prevent a sudden change in the supply of the operating fluid inside the wheel cylinder 1 or quick close of the fluid passageway 112a at the time of braking according to the duo-servo type drum brake device 200. It is therefore possible to realize both relaxation of impact at the time of quick braking and fine control of braking force.

The application of a valve opening and closing mechanism according to the present invention is not limited to the above-mentioned embodiment. The valve opening and closing mechanism according to the present invention is applicable to various apparatus and equipment of which gentle control of opening and closing a fluid passageway is needed.

In the valve opening and closing mechanism according to the present invention, when the supply of the operating fluid from the inlet to the fluid chamber in the cylinder increases suddenly so that the flow rate of the operating fluid passing through the fluid passageway of the control piston from the fluid chamber in the cylinder reaches a predetermined value or more, the valve assembly is displaced toward the control piston. As a result, the fluid passageway of the control piston is changed over into a mode in which the fluid passageway communicates with the fluid chamber in the cylinder through a clearance between the inner ring portion and the shaft portion to thereby substantially narrow the opening area of the fluid passageway. Thus, the supply of the operating fluid through the fluid passageway of the control piston can be restrained.

Moreover, when the control piston is suddenly displaced toward the fluid chamber in the cylinder and the quantity of displacement of the control piston reaches a predetermined value so that the valve assembly is held between the control piston and the valve support portion of the valve guide, the fluid passageway of the control piston is closed so that the supply of the operating fluid from the fluid passageway is stopped. However, during the displacement of the control piston before the fluid passageway of the control piston is closed, the sectional area for passing the operating fluid is reduced gradually due to the conical surface portion provided on the shaft portion of the valve guide. Thus, there is no fear that the fluid passageway is closed at a stretch.

That is, in the valve opening and closing mechanism according to the present invention, the supply of the operating fluid is prevented from increasing or decreasing suddenly in either the case where the operating fluid is supplied through the fluid passageway of the control piston or the case where the fluid passageway is closed to stop the supply of the operating fluid.

Therefore, if the valve opening and closing mechanism is, for example, used in a wheel cylinder of a duo-servo drum brake device in order to open and close a fluid passageway in a cylinder receiving fluid pressure from a master cylinder, a sudden change in the supply of the operating fluid or quick close of the fluid passageway can be prevented at the time of braking. Accordingly, both the relaxation of impact at the time of quick braking or the fine control of the braking force can be realized.

While only a certain embodiment of the invention has been specifically described herein, it will be apparent that numerous modifications may be made thereto without departing from the spirit and scope of the invention.

The present invention is based on Japanese Patent Application No. Hei. 11-7995 which is incorporated herein by reference.

What is claimed is:

1. A valve opening and closing mechanism comprising:

a cylinder including an inlet for supplying fluid;

a control piston slidably fitted to said cylinder, said control piston including a first fluid passageway for supplying fluid to said cylinder;

a valve guide supported in a fluid chamber defined by said cylinder and said control piston, said valve guide including a shaft portion inserted into the first fluid passageway of said control piston and defining a first clearance for supplying fluid, and a valve support portion formed into a collar at a base end of the shaft portion of said valve guide and facing an end surface of said control piston, the shaft portion of said valve guide having a conical surface portion for reducing a first sectional area when said control piston is displaced toward said fluid chamber; and a valve assembly loosely fitted to the shaft portion of said valve guide so as to move toward said control piston with flow of fluid to narrow the first fluid passageway of said control piston when a flow rate of the fluid flowing through the first fluid passageway of said control piston is greater than or equal to a predetermined value.

2. The valve opening and closing mechanism according to claim 1, wherein said valve assembly includes an inner ring portion and an outer ring portion, said inner ring portion defining a second clearance between the inner ring portion and the shaft portion of said valve guide so that the second clearance defines a second fluid passageway having a second sectional area smaller than the first sectional area defined by the first fluid passageway of said control piston and the shaft portion of said valve guide, said outer ring portion being held tightly between said control piston and said valve support portion to close the first fluid passageway of said control piston in cooperation with the valve support portion of said valve guide when the quantity of displacement of said control piston toward the fluid chamber reaches a predetermined value, and wherein the outer ring portion of said valve assembly abuts tightly against an end surface of said control piston when the flow rate of the fluid flowing through the first fluid passageway of said control piston is greater than or equal to a predetermined value to thereby displace said valve assembly toward said control piston, so that the first fluid passageway of said control piston is switched to a mode in which the first fluid passageway communicates with the fluid chamber inside said cylinder through the second clearance between the inner ring portion and the shaft portion of said valve guide.

* * * * *